United States Patent
Münch et al.

(10) Patent No.: US 10,718,666 B2
(45) Date of Patent: Jul. 21, 2020

(54) SPECTROMETER ARRANGEMENT, METHOD FOR PRODUCING A TWO-DIMENSIONAL SPECTRUM BY MEANS OF SUCH A SPECTROMETER ARRANGEMENT

(71) Applicant: Analytik Jena AG, Jena (DE)

(72) Inventors: Stefan Münch, Berlin (DE); Michael Okruss, Potsdam (DE)

(73) Assignee: Analytik Jena AG, Jena (DE)

( * ) Notice: Subject to any disclaimer, the term of this patent is extended or adjusted under 35 U.S.C. 154(b) by 55 days.

(21) Appl. No.: 16/225,121

(22) Filed: Dec. 19, 2018

(65) Prior Publication Data

US 2019/0186992 A1 Jun. 20, 2019

(30) Foreign Application Priority Data

Dec. 20, 2017 (DE) .......................... 10 2017 130 772

(51) Int. Cl.
*G01J 3/04* (2006.01)
*G01J 3/22* (2006.01)
(Continued)

(52) U.S. Cl.
CPC .............. *G01J 3/04* (2013.01); *G01J 3/0208* (2013.01); *G01J 3/14* (2013.01); *G01J 3/1809* (2013.01);
(Continued)

(58) Field of Classification Search
CPC .... G01J 2003/1208; G01J 3/0208; G01J 3/04; G01J 3/14; G01J 3/1809; G01J 3/22
See application file for complete search history.

(56) References Cited

U.S. PATENT DOCUMENTS

| 4,325,634 A | 4/1982 | Tohyama |
| 4,575,243 A * | 3/1986 | Witte ................. G01J 3/0229 356/308 |
| 2009/0021819 A1* | 1/2009 | Amos ................. G01J 3/14 359/234 |

FOREIGN PATENT DOCUMENTS

DE 102009059280 A1 6/2011

OTHER PUBLICATIONS

R. Vuilleumier and K. Kraiczek likewise present a variable entrance slit in the article "Variable entrance slit system for precision spectrophotometers", Micro Electro Mechanical Systems, 1995, MEMS '95, Proceedings. IEEE, DOI 10.1109/MEMSYS.1995. 472583, pp. 181-185.

* cited by examiner

*Primary Examiner* — Hina F Ayub
(74) *Attorney, Agent, or Firm* — Christopher R. Powers; Endress+Hauser (USA) Holding Inc.

(57) ABSTRACT

The present disclosure discloses a spectrometer arrangement including an entrance-slit group including a slit wheel and a slit mask for introducing radiation into and for limiting the optical field of the spectrometer arrangement, a first dispersive element for spectrally decomposing the radiation in a main dispersion direction, and a second dispersive element for spectrally decomposing the radiation in a transverse dispersion direction that forms an angle with the main dispersion direction to yield a two-dimensional spectrum. The slit wheel is mounted rotatably about an axis of rotation and has a falcate opening having a width that changes depending on the angle. The slit mask includes an opening that is longer than a largest width of the falcate opening such that radiation radiates through the falcate opening of the slit wheel and the opening of the slit mask. The present disclo- (Continued)

sure further includes a corresponding method and an optical component group.

22 Claims, 3 Drawing Sheets

(51) Int. Cl.
*G01J 3/02* (2006.01)
*G01J 3/18* (2006.01)
*G01J 3/14* (2006.01)
G01J 3/12 (2006.01)

(52) U.S. Cl.
CPC ......... *G01J 3/22* (2013.01); *G01J 2003/1208* (2013.01)

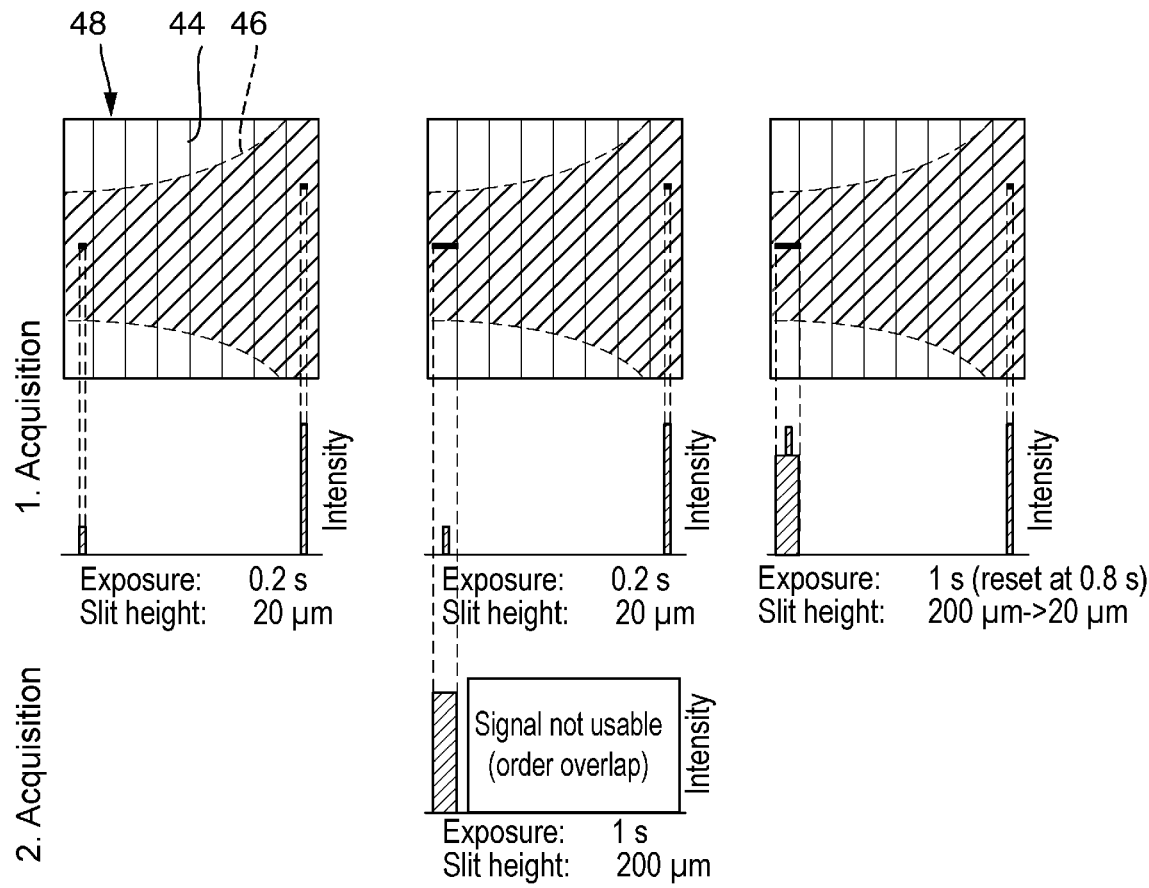

SPECTROMETER ARRANGEMENT, METHOD FOR PRODUCING A TWO-DIMENSIONAL SPECTRUM BY MEANS OF SUCH A SPECTROMETER ARRANGEMENT

CROSS-REFERENCE TO RELATED APPLICATION

The present application is related to and claims the priority benefit of German Patent Application No. 10 2017 130 772.9, filed on Dec. 20, 2017, the entire contents of which are incorporated herein by reference.

TECHNICAL FIELD

The present disclosure relates to a spectrometer arrangement, a method for producing a two-dimensional spectrum by means of such a spectrometer arrangement, and an optical component group for retrofitting such a spectrometer arrangement.

BACKGROUND

An example of such a spectrometer arrangement is an echelle spectrometer with internal order separation. The problem underlying the present disclosure shall be explained below with reference to an echelle spectrometer.

Such a spectrometer arrangement is, for example, known from DE 10 2009 059 280 A1.

In an echelle spectrometer, gratings having a ladder-like cross-section are used. Illuminating the short facet of the step-like structure with a suitable blaze angle generates a diffraction pattern, which concentrates the diffracted intensity in high orders, e.g., in the fiftieth to one-hundredth order. High spectral resolutions can thereby be achieved with a compact arrangement. The orders can be superimposed, depending on the incident wavelengths. In the case of echelle spectrometers with internal order separation, the orders are therefore again dispersed transversely to the dispersion direction of the echelle grating to separate the various orders occurring. In this way, a two-dimensional spectrum is obtained, which can be detected using area detectors.

An echelle spectrometer with internal order separation differs from echelle spectrometers with external order separation in that, in the latter, only radiation from a small spectral range enters the spectrometer. In spectrometers with internal order separation, the spectrum is produced in the form of a two-dimensional structure in the detector plane. This structure consists of spectral sections arranged essentially parallelly to one another. The free spectral ranges of the respective diffraction orders together yield a slit-free spectrum for a specific wavelength range. The use of an area detector with a plurality of detector elements allows simultaneous detection of a large wavelength range with high spectral resolution.

As mentioned above, echelle spectrometers with internal order separation in the image plane produce a spectrum in the form of a two-dimensional diffraction order structure. The distance between two adjacent orders depends on the dispersion properties of the transverse dispersion element. If a prism is used as such, the spatial separation of the orders decreases continuously as the wavelength increases. If different wavelength ranges are sequentially acquired using the spectrometer, the slit height must be adapted to the measuring range in question to maximize light conductance on the one hand and ensure clean order separation on the other hand.

To be able to resolve the intensity components of the individual wavelengths of a radiation source using a spectrometer, the optical field to be analyzed must be spatially narrowly limited. In certain cases, the image generated with the aid of an upstream lens is small enough that the field does not need to be limited (slitless spectroscopy). In other cases, the radiation of the source is guided to the spectrometer using light guides. In this case, the exit surface of the fiber can function as a field limiter.

Very frequently, however, the light source is imaged onto a field diaphragm, the entrance slit. Slit-shaped diaphragms are often used. In the dispersion direction, the slit opening is very narrow to achieve optimum spectral resolution. In this direction, this is referred to as the slit width.

Transversely to the dispersion direction, the so-called slit height tends to be selected as large as possible to improve light throughput and thus the signal-to-noise ratio. To derive a clean spectral intensity distribution from the captured image, a clean separation of the diffraction orders on the detector is required, which limits the slit height. Furthermore, the distance between two adjacent diffraction orders is variable via the wavelength range used. Depending on the transverse dispersion element used, the order separation increases (grating as transverse disperser) or decreases (prism as transverse disperser) as the wavelength increases. The height of the entrance slit is normally determined by the distance of the most closely spaced orders detected. When using area detectors for detecting the echelle spectra, a considerable part of the detector area thus remains unused.

Different individual slits are usually pivoted into the beam path when different diaphragm sizes (with respect to slit height and/or slit width) are required. However, a variable slit is also known from U.S. Pat. No. 4,325,634. R. Vuilleumier and K. Kraiczek likewise present a variable entrance slit in the article "Variable entrance slit system for precision spectrophotometers", Micro Electro Mechanical Systems, 1995, MEMS '95, Proceedings. IEEE, DOI 10.1109/MEMSYS.1995.472583. Usually, the slit width can be adjusted by moving two slit jaws, generally via micrometer calipers. Commercially available, for example from Newport (Newport Motor Driven Slit Assembly, M5257), are motorized slits in which the slit width can be adjusted continuously via software.

SUMMARY

The aim of the present disclosure is to provide a spectrometer which allows a high resolution across a large wavelength range. In addition, light conductance is to be maximized and, at the same time, a clean order separation is to be ensured.

The aim is achieved by a spectrometer arrangement comprising: an entrance-slit group for introducing radiation into the spectrometer arrangement and for limiting the optical field of the spectrometer arrangement; a first dispersive element for spectrally decomposing the radiation in a main dispersion direction; and a second dispersive element for spectrally decomposing the radiation in a transverse dispersion direction, which forms an angle with the main dispersion direction so that a two-dimensional spectrum can be produced. The spectrometer arrangement is characterized in that the entrance-slit group comprises a slit wheel, wherein the slit wheel is mounted rotatably about an axis of rotation, wherein the slit wheel has at least one falcate opening, wherein the width of the opening changes depending on the angle, wherein the width of the opening extends in the transverse dispersion direction, wherein the entrance-slit group comprises a slit mask, wherein the slit mask has an opening which is longer than the largest width of the falcate opening, and wherein radiation radiates through the falcate opening of the slit wheel and the opening of the slit mask into the spectrometer arrangement.

In contrast to many commercially available variable slits, the slit height can be changed very quickly, since no reduction movements in the micrometer range are performed with movable slit jaws.

Spectrometer systems with detectors having a very small pixel size benefit especially from an accurate slit setting. The correct slit height can thus be set highly precisely depending on the wavelength to maximize light throughput and still ensure clean order separation. The dynamic slit makes it possible to adapt dynamically to the circumstances in the case of thermal drifts and associated changes in imaging quality.

In the case of pivotable individual slits, the problem can arise that the intensity centroid of the spectral line changes as soon as a new slit is pivoted in. This can be attributed to the limited production, assembly, and adjustment accuracy. This is especially problematic when the analytical application relies on a highly accurate wavelength scale. In the case of the proposed slit design, a displacement of the line on the detector during a slit height change is excluded at least in the main dispersion direction because the position is predetermined by the fixed slit mask.

The term "slit wheel" within the scope of this application refers to a disk-shaped object having a substantially circular outline. In one embodiment, the "slit wheel" is designed as a circle segment (sector of a circle), that is to say a partial area of a circular area which is delimited by an arc and two circle radii.

In one embodiment, the distance from the axis of rotation to the central axis of the falcate opening is constant across the rotational angle.

In one embodiment, the width of the opening continuously changes across the rotational angle.

In one embodiment, the width of the opening mathematically increases continuously across the rotational angle.

In one embodiment, the width of the opening changes linearly across the rotational angle.

In one embodiment, the width of the opening changes exponentially across the rotational angle.

In one embodiment, the width of the opening changes across the rotational angle from 20 µm to 400 µm.

In one embodiment, the slit wheel has a plurality of falcate openings of variable width. In this case, a particular width can also occur in a plurality of openings. Alternatively, a particular width may occur only once in total. The opening then increases continuously across the rotational angle.

In one embodiment, the slit wheel is rotated by means of a motor, especially using a transmission.

In one embodiment, the slit mask is of rectangular design and has an opening with a constant width in the main dispersion direction.

In one embodiment, the width of the opening of the slit mask is between 10 µm and 100 µm.

In one embodiment, the slit mask is arranged movably with respect to the slit wheel. This is, for example, used in the adjustment of the mask; during operation, the mask is fixed. In spectrometers with area detectors, the images of the spectral lines are aligned as exactly as possible according to the pixel raster of the detector. When using a slit wheel with individual slits according to the prior art, either the position of the slit wheel or the alignment of the detector must be finely adjusted for this purpose. In the proposed solution, the alignment can be made via the fixed slit mask by moving it in relation to the slit wheel.

In one embodiment, the slit mask has a falcate opening, wherein the width of the opening changes depending on the angle, the width of the opening extending in the main dispersion direction.

In one embodiment, the center of the slit mask (rectangular design) or the central axis of the falcate opening (falcate design) of the slit mask lies on the central axis of the falcate opening of the slit wheel. As mentioned, the slit mask must be longer than the width of the falcate opening. If the respective centers are situated one above the other or along an axis, light entry is thereby limited in the transverse dispersion direction only by the slit mask.

In one embodiment, the spectrometer arrangement comprises a collimator, especially, a collimator mirror, especially, designed as a parabolic or spherical mirror, which is arranged downstream of the entrance-slit group in the incident direction.

In one embodiment, the spectrometer arrangement forms a Littrow spectrometer. The collimator thus also simultaneously forms the camera mirror which images the image onto the detector.

In one embodiment, the first dispersive element is designed as an echelle grating.

In one embodiment, the second dispersive element is designed as a prism.

In one embodiment, the prism is mirrored on the rear side.

In one embodiment, the prism is rotatably mounted. As a result, the wavelength range to be examined can be adjusted.

In one embodiment, the second dispersive element is designed as a diffraction grating.

In one embodiment, the spectrometer arrangement comprises a detector, especially, a CCD array or a CMOS detector, for receiving the two-dimensional spectrum.

The aim is further achieved by a method for producing a two-dimensional spectrum by means of a spectrometer arrangement as described above. The method comprises the following steps: irradiating radiation into a spectrometer arrangement via an entrance-slit group; spectrally decomposing the radiation in a main dispersion direction; spectrally decomposing the radiation in a transverse dispersion direction which forms an angle with the main dispersion direction so that a two-dimensional spectrum can be produced; and imaging the two-dimensional spectrum on a detector.

As mentioned, the described concept allows the slit height to be quickly and accurately adapted to the respective measuring range. In interaction with a specific class of detectors, the dynamic adaptation of the slit height is achieved during an exposure (i.e., without intermediate reading of the detector), which is explained in more detail below.

As described above, in a conventional echelle spectrometer having a prism as the order-sorting element, the distances between two orders in the short-wavelength range become larger and larger. This leaves large parts of the detector unused. In the case of the application in which emission lines with low intensities (meaning the intensity per pixel) occur in the short-wavelength range and more intense lines occur in the long-wavelength range, an improvement in light conductance can be achieved by changing the slit height during the exposure, for example by means of the slit wheel with falcate opening described above. A prerequisite in this respect is for the detector to have the option of discharging the accumulated charge for individual segments of the detector during acquisition or of changing the measuring range of the detector dynamically (for example, CMOS detectors with "Region of Interest" (ROI) function.

In one embodiment, the method thus further comprises the steps: rotating the slit wheel into a first position with a large width of the falcate opening so that short-wave diffraction orders can be distinguished in the spectrum; waiting until a first saturation value of the detector for the short-wave diffraction orders is reached; rotating the slit wheel into a second position with a smaller width of the falcate opening compared to the first position; deleting the values of the detector for long-wave diffraction orders; and waiting until a second saturation value of the detector for the long-wave diffraction orders is reached.

In one embodiment, the method further comprises the step of rotating an element for spectral decomposition of the radiation in a transverse dispersion direction in order to change the wavelength range of the spectrometer arrangement.

The aim is further achieved by an optical component group for retrofitting a spectrometer arrangement as described above, wherein the component group comprises at least a slit wheel and a slit mask, wherein the slit wheel is mounted rotatably about an axis of rotation, wherein the slit wheel has a falcate opening, wherein the width of the opening changes depending on the angle, wherein the width of the opening extends in the transverse dispersion direction, wherein the slit mask comprises an opening which is longer than the largest width of the falcate opening, and wherein radiation radiates through the falcate opening of the slit wheel and the opening of the slit mask into the spectrometer arrangement.

BRIEF DESCRIPTION OF THE DRAWINGS

This will be explained in more detail with reference to the following figures.

FIGS. 4A, 4B and 4C show three different measuring regimes for the spectrometer arrangement of FIG. 3.

In the figures, the same features are denoted by the same reference symbols.

DETAILED DESCRIPTION

Figure 1:
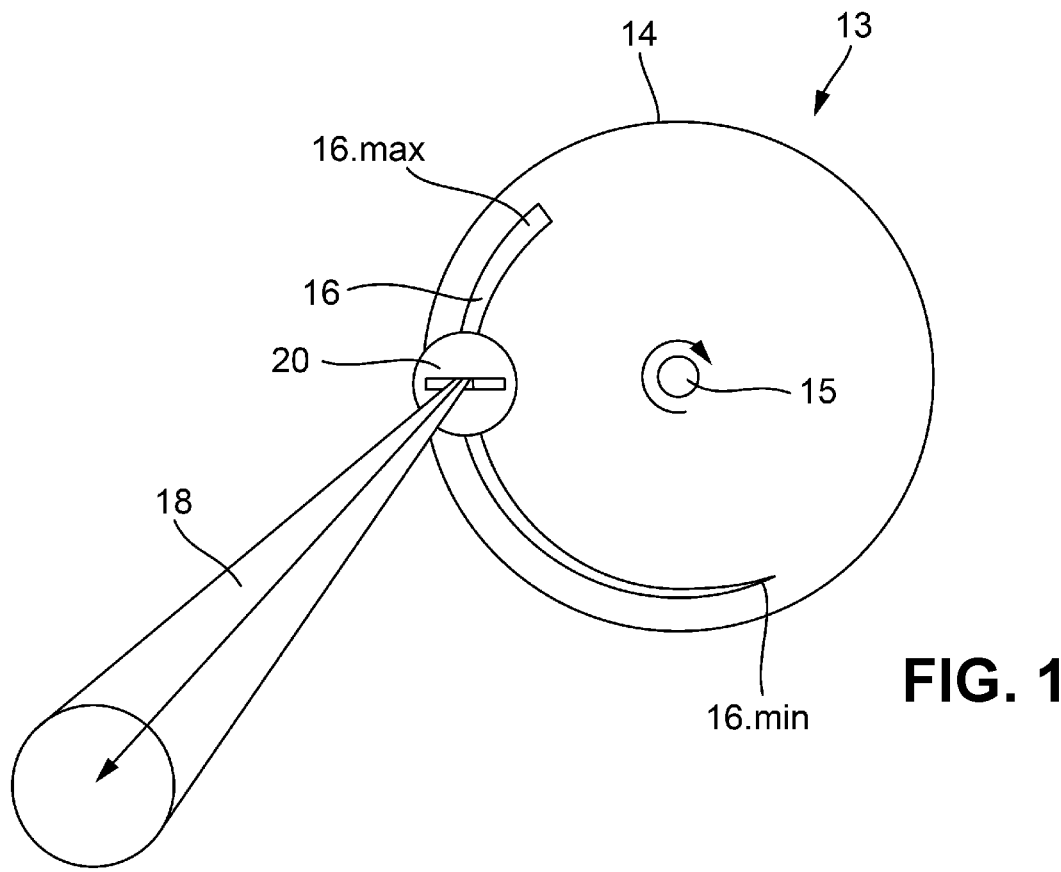
FIG. 1 shows a slit wheel.

The structure of the claimed subject-matter is first illustrated with reference to FIG. 1. The proposed construction consists of a slit wheel 14. The slit wheel 14 is rotatably mounted in the center about an axis of rotation 15. The axis 15 is rotated via a motor, optionally with an intermediate transmission. The alignment of the slit wheel 14 is clearly defined during operation, for example, via a reference position and an angle transmitter on the motor or the like.

The slit wheel 14 has a falcate opening 16. The distance between the center M of the falcate opening, i.e., the central axis, to the axis of rotation 15 of the slit wheel is constant, but the width of the falcate opening 16 changes depending on the angle. The width of the falcate opening 16 at the point of light entry into the spectrometer determines the height of the entrance aperture during operation. Correspondingly, the width of the falcate opening 16 tapers continuously from the largest 16.max to the smallest required slit height 16.min.

In the present disclosure, the term "width of the falcate opening" is used in the right-left direction. Correspondingly, the "slit height" also extends in the right-left direction. Likewise, the "length" of the slit mask 20 (see below) extends in the right-left direction. The "slit width" extends from top to bottom. The "width" of the opening 22 of the slit mask 20 (see below) likewise extends from top to bottom.

To also define the slit width, a second diaphragm mask 20 having an opening 22 in a slit shape is located directly downstream or upstream of the slit wheel 14 at the point of light entry into the spectrometer and superimposed on the falcate opening 16. The longitudinal edge of the opening 22 essentially points in the direction of the axis of rotation 15. The width of the opening 22 corresponds directly to the actual slit width of the spectrometer. The length of the fixed slit opening 22 is only relevant insofar as it must be larger in any case than the width of the falcate opening 16 to not shade any light in the slit height direction.

By rotating the slit wheel 14, the falcate opening 16 can now be adjusted steplessly and with high precision in its slit height. The resolution of the slit height adjustment depends on the radius of the falcate opening arc (to the center of rotation 15), the slope ratio of the falcate opening 16 in $\mu m/°$, and the smallest possible adjustable angular increment of the motor (or motor/gear combination). Depending on the angular position of the slit wheel 14, the width of the falcate opening 16 need not increase linearly but may be adjusted locally to adapt to the needs regarding slit height resolution and speed of adjustment.

In one embodiment, the slit width 22 is variable. To this end, the above-described fixed slit mask 20 is replaced by a second slit wheel with a falcate opening or by another dynamic device for adjusting the slit width. If a second falcate opening is used for slit width adjustment, this will however become noticeable with high slits in the form of slightly curved slit images. On the other hand, such an arrangement could in turn be used in known spectrometer configurations in which curved entrance slits (or exit slits) are used for aberration control or for suppression of the so-called "smile" effect (spectrometer-induced curvature of the slit image, especially in imaging spectrometers).

In summary, the claimed spectrometer arrangement provides a slit wheel 14 in combination with a fixed slit mask 20. The slit wheel 14 has a falcate opening 16 of variable width which defines the slit height. By contrast, the slit width is defined by a fixed slit mask 20 directly upstream or downstream of the slit wheel 14.

The claimed spectrometer arrangement allows the slit height to be adapted quickly and accurately to the measuring range in question. Furthermore, the spectrometer arrangement, in interaction with a specific class of detectors, enables dynamic adaptation of the slit height during an exposure, i.e., without intermediate reading of the detector 44.

Specifically, acquisition is started with a large slit height so that the short-wave orders containing useful lines are only just cleanly separated. In this phase of the exposure, long-wave orders overlap very markedly; the data of this detector segment are thus initially unusable. When the pixels in the short-wavelength range have reached a certain predetermined degree of saturation, the slit height is reduced during acquisition by rotating the slit wheel 14. Once this process is completed, the charge in the segment of the long-wave orders is discharged (i.e., reset), and the actual acquisition for this region now also starts with cleanly separated orders.

No reset takes place in the short-wave segment, and acquisition continues to run, though now with a correspondingly smaller slit height. This is explained in more detail below in reference to FIG. 3 and FIG. 4.

Figure 2:
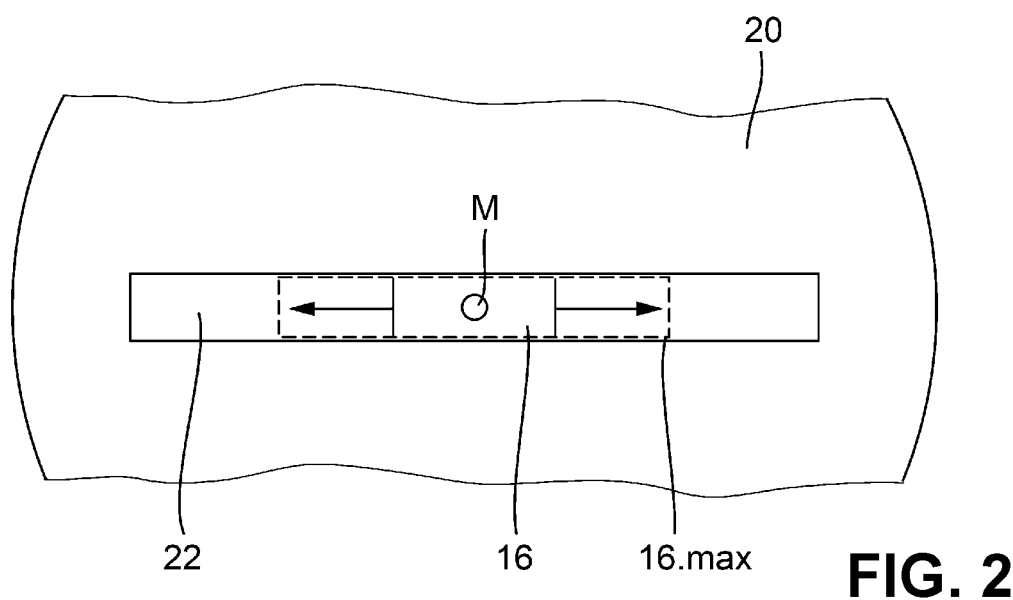
FIG. 2 shows a section of the slit wheel of FIG. 1.

Short wavelengths in which photoelectrons are generated from the exposure with different slit heights have in this case a non-uniform intensity distribution across the slit height. The photoelectrons of the exposure with the longest slit extend over the entire evaluable height of the diffraction order. Additional photoelectrons from the measurement time with smaller slits concentrate in the center M of the slit height. However, assuming perfect manufacturing and assembly accuracy and stigmatic imaging, this has no impact on the intensity centroid of the line or on the binning procedure. For this purpose, the slit expands symmetrically to the center M of the falcate opening 16, see FIG. 2.

Figure 3:
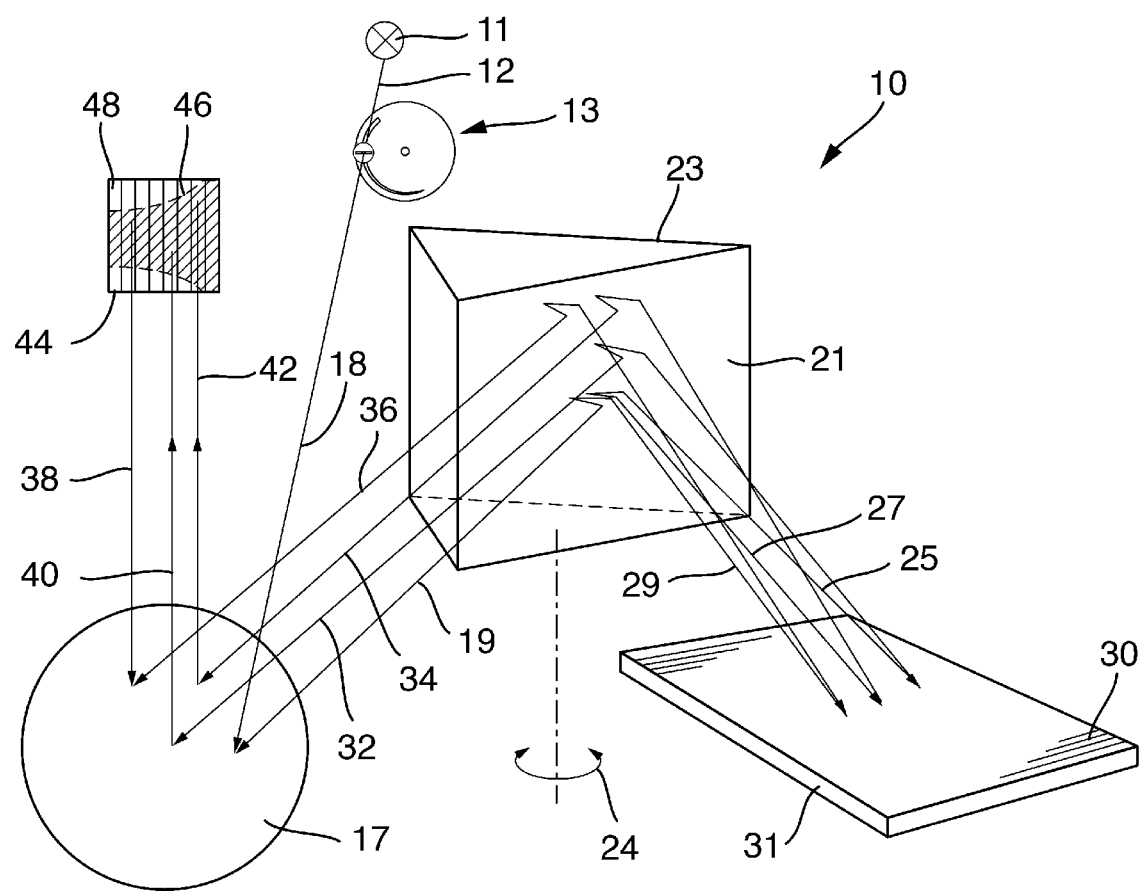
FIG. 3 shows a spectrometer arrangement according to the present disclosure with the slit wheel of FIG. 1.

FIG. 3 shows a spectrometer arrangement 10 according to the present disclosure. Light from a broadband light source 11 is guided via an upstream lens 12 to an entrance-slit group 13 and then radiates 18 into the spectrometer. An example of such a light source 11 is a plasma torch as used in ICP OES ("inductively-coupled plasma optical emission spectrometry"). In this case, wavelengths between 165 nm and 900 nm are detected with the system.

The entrance-slit group 13 consists of a slit wheel 14 which is mounted rotatably about an axis of rotation 15 and is rotated by a stepper motor. The slit wheel 14 has a falcate opening 16. The width of the falcate opening may be 400 µm at the widest point (reference symbol 16.max) and 20 µm at the narrowest point (reference symbol 16.min). This corresponds to the largest and smallest slit height required for the described echelle spectrometer. From the widest to the narrowest point, the falcate opening 16 tapers continuously but not necessarily linearly.

Directly downstream or upstream of the slit wheel 14, a slit mask (e.g., diaphragm) 20 with a slit opening 22 is also located in the beam path. The longer slit side points in the direction of the center of rotation 15 of the slit wheel 14. The alignment of the mask 20 can easily be changed for adjustment purposes but is fixed during operation. The distance between slit wheel 14 and slit mask 20 is as small as possible. The two diaphragms 14, 20 together form the entrance slit.

The radiation 18, which passes the slit group 13, proceeds to the collimator mirror 17, which sends the collimated bundles 19 to a prism 21. The prism 21 is mirrored on the rear side 23 and mounted rotatably about an axis 24. By rotation of the prism 21, the wavelength range detected by a detector 44 can be adjusted. The radiation predispersed by the prism 21 (symbolized here by three wavelengths 25, 27, 29) arrives at the echelle grating 31, the main dispersion element, which fans out the radiation transversely to the prism dispersion for it to then travel back to the prism 21 again. After another double-pass through the prism 21, the radiation 32, 34, 36 arrives at the collimator mirror 17, which also functions as a camera mirror in the present Littrow configuration. The camera mirror 17 then images the produced echelle spectrum 46 onto the CCD detector 44. FIG. 3 shows the edge of the free spectral range of an echelle spectrum 46. In FIG. 3, the area detector 44 is divided into eight strip segments 48. In fact, the detector has a resolution of, for example, 1000×1000. The detector 44 is aligned such that the strips 48 are approximately aligned the same as diffraction orders. The entire detector 44 is read simultaneously. However, an individual reset time at which the charge of the respective strip 48 is "discharged" can be stipulated for each of the strips 48. The effective exposure time for the individual segments can thus be individually adapted to the brightness ratios.

In the present case, the optical elements of the spectrometer arrangement 10 are aligned in such a way that the longer-wave radiation 42 impinges on the detector 44 on the right-hand side and the shorter-wave radiation 38 on the left-hand side in accordance with FIG. 3 or FIGS. 4A-4C.

Via rotation 24 of the prism 21, the detected wavelength range may be adjusted steplessly. In the present case, the longest-wave radiation comprises radiation between 226 nm and 900 nm. In this case, the slit height must be 20 µm to also separate the longest-wave orders. The shortest-wavelength measuring range comprises light between 165 nm and 193 nm. Due to the greater order separations, the slit 16 can be increased by rotation 15 of the slit wheel 14 to 400 µm. The measuring range at which the maximum light conductance is given can be precisely set and, with simultaneous clean order separation, for every other measuring range.

In the present example, the following parameters are set for the slit design. The distance from the falcate opening 16 to the center of rotation M of the slit wheel 14 is 22 mm. The falcate opening 16 extends over a quarter of the circumference of the slit wheel 14 and has a minimum diameter 16.min of 20 µm and a maximum diameter 16.max of 400 µm. The slit wheel 14 is driven by a stepper motor with an angular resolution of 1.8°. If necessary, the angular resolution can be increased by a factor, for example by a factor of 8, by suitable control of the motor. Assuming adequate manufacturing, storage, and assembly accuracy, a slit height resolution of less than 1 µm is achieved with the described spectrometer arrangement 10.

The case of a dynamic adjustment of the slit height during an acquisition is particularly worthwhile in a long-wave measuring tile. As described above, a minimum slit 16.min with a height of 20 µm is used in the measuring range between 226 nm and 900 nm. However, the shortest-wave orders are also cleanly separated at a slit height that is 10 times larger. FIGS. 4A-4C illustrate how different measuring regimes affect the total measurement time and the acquired overall signals. In the example calculation, two lines at the long-wavelength and short-wavelength ends of the range are measured. It is assumed that the line in the short-wavelength range is 5× weaker (pixel intensity) than the long-wavelength line and that in the latter, the desired saturation (e.g. 70% detector capacitance) is reached after an exposure time of 0.2 s. The reading of the detector takes 1.25 seconds in each case.

In the measuring regime in FIG. 4A, only one acquisition with an exposure time of 0.2 s is made. The slit height is constant at 20 µm. During the total measurement time of 1.45 s, strong signals are obtained in the long-wavelength range but only very weak overall signals are obtained in the short-wavelength range due to the low intensity and slit height.

In the case in FIG. 4B, a further acquisition with a slit height of 200 µm and an exposure time of 1 s is now additionally made. Due to the large slit height, a high signal strength can now be achieved in the short-wavelength range. However, the total measurement time increases to 3.7 s due to the additional exposure and reading time.

The method in FIG. 4C combines the two approaches described above. One acquisition is made with a total exposure time of 1 s. The exposure is started at a slit height of 200 µm. As soon as the intensity in the short-wavelength range is almost 80% of the desired saturation (after approx. 0.8 s), the slit height is set to 20 µm and the charge in the long-wave segment is discharged (reset). For the remaining 0.2 s, measurements are taken at both wavelengths using the small slit height. This results in a total measurement time of 2.25 s. During this time, strong signals can be generated at both wavelengths.

The present disclosure can in principle be used in any spectrometer arrangement in which the use of an entrance slit of variable height is desirable. The present disclosure is especially suitable for echelle spectrometers with dynamic measuring ranges, in which the slit height must be adapted to the respective measuring range in order to maximize the geometric light conductance.

The invention claimed is:

1. A spectrometer arrangement comprising:
   an entrance-slit group configured to enable introducing radiation into the spectrometer arrangement and limiting the optical field of the spectrometer arrangement, the entrance-slit group including a slit wheel and a slit mask;
   a first dispersive element adapted to spectrally decompose the radiation in a main dispersion direction; and
   a second dispersive element adapted to spectrally decompose the radiation in a transverse dispersion direction that forms an angle with the main dispersion direction such that a two-dimensional spectrum can be produced,
   wherein the slit wheel is mounted rotatably about an axis of rotation and includes at least one falcate opening having a variable width depending on an angle of rotation of the slit wheel, wherein the width of the at least one falcate opening extends in the transverse dispersion direction,
   wherein the slit mask includes a mask opening that is longer than a largest width of the at least one falcate opening, and
   wherein radiation radiates through the at least one falcate opening of the slit wheel and the mask opening of the slit mask into the spectrometer arrangement.

2. The spectrometer arrangement of claim 1, wherein a distance from the axis of rotation to a central axis of the at least one falcate opening is constant across a rotational angle.

3. The spectrometer arrangement of claim 1, wherein the width of the at least one opening changes continuously across a rotational angle.

4. The spectrometer arrangement of claim 1, wherein the width of the at least one opening changes linearly across a rotational angle.

5. The spectrometer arrangement of claim 1, wherein the width of the at least one opening changes from 20 µm to 400 µm across a rotational angle.

6. The spectrometer arrangement of claim 1, wherein the slit wheel includes a plurality of falcate openings of variable width.

7. The spectrometer arrangement of claim 1, wherein the slit mask is rectangular, and the mask opening has a constant width in the main dispersion direction.

8. The spectrometer arrangement of claim 7, wherein the slit mask is movably arranged with respect to the slit wheel.

9. The spectrometer arrangement of claim 1, wherein the mask opening of the slit mask is a falcate opening, wherein the width of the mask opening changes depending on the angle of rotation, wherein the width of the mask opening is in the main dispersion direction.

10. The spectrometer arrangement of claim 9, wherein a center of the slit mask, or a central axis of the falcate mask opening of the slit mask, lies on the central axis of the at least one falcate opening of the slit wheel.

11. The spectrometer arrangement of claim 1, further comprising a collimator arranged downstream of the entrance slit group in an incident direction.

12. The spectrometer arrangement of claim 11, wherein the collimator is a parabolic mirror or spherical mirror.

13. The spectrometer arrangement of claim 11, wherein the spectrometer arrangement forms a Littrow spectrometer.

14. The spectrometer arrangement of claim 1, wherein the first dispersive element is an echelle grating.

15. The spectrometer arrangement of claim 1. wherein the second dispersive element is a prism.

16. The spectrometer arrangement of claim 15, wherein the prism is mirrored on a rear surface.

17. The spectrometer arrangement of claim 15, wherein the prism is rotatably mounted.

18. The spectrometer arrangement of claim 1, further comprising a CCD array or a CMOS detector configured to receive a two-dimensional spectrum.

19. A method for generating a two-dimensional spectrum using a spectrometer arrangement, the method comprising:
   directing radiation into a spectrometer arrangement via an entrance-slit group, wherein the spectrometer arrangement includes:
      the entrance-slit group configured to enable introducing the radiation into the spectrometer arrangement and limiting the optical field of the spectrometer arrangement, the entrance-slit group including a slit wheel and a slit mask;
      a first dispersive element adapted to spectrally decompose the radiation in a main dispersion direction; and
      a second dispersive element adapted to spectrally decompose the radiation in a transverse dispersion direction that forms an angle with the main dispersion direction such that a two-dimensional spectrum can be produced, wherein the slit wheel is mounted rotatably about an axis of rotation and includes at least one falcate opening having a variable width depending on an angle of rotation of the slit wheel, wherein the width of the at least one falcate opening extends in the transverse dispersion direction, wherein the slit mask includes a mask opening that is longer than a largest width of the at least one falcate opening, and wherein radiation radiates through the at least one falcate opening of the slit wheel and the mask opening of the slit mask into the spectrometer arrangement;
   spectrally decomposing the radiation in a main dispersion direction;
   spectrally decomposing the radiation in a transverse dispersion direction, which forms an angle with the main dispersion direction such that a two-dimensional spectrum is generated; and
   imaging the two-dimensional spectrum on a detector.

20. The method of claim 19, further comprising:
   rotating the slit wheel to a first position having a larger width of the at least one falcate opening such that short-wave diffraction orders are distinguished in the spectrum;
   starting an exposure process of the detector;
   waiting until a first saturation value of the detector for the short-wave diffraction orders is reached;
   rotating the slit wheel to a second position having a smaller width of the at least one falcate opening compared to the first position;
   deleting the values of the detector for long-wave diffraction orders;

waiting until a second saturation value of the detector for the long-wave diffraction orders is reached; and concluding the exposure process and reading the detector.

21. The method of claim 20, further comprising:

rotating an element for spectral decomposition of the radiation in a transverse dispersion direction to change the wavelength range of the spectrometer arrangement.

22. An optical component group for retrofitting a spectrometer, comprising:

a slit wheel mounted rotatably about an axis of rotation; and a slit mask, wherein the slit wheel has a falcate opening having a width in a transverse dispersion direction that changes depending on an angle of rotation of the slit wheel, wherein the slit mask has a mask opening that is longer than a largest width of the falcate opening, and wherein radiation radiates through the falcate opening of the slit wheel and the opening of the slit mask into the spectrometer.

* * * * *